(12) United States Patent
May

(10) Patent No.: US 9,983,073 B2
(45) Date of Patent: May 29, 2018

(54) SOLID BORNE SOUND WAVE PHASE DELAY COMPARISON

(71) Applicant: TORQUE AND MORE (TAM) GMBH, Starnberg (DE)

(72) Inventor: Lutz May, Berg (DE)

(73) Assignee: TORQUE AND MORE (TAM) GMBH, Starnberg (DE)

( * ) Notice: Subject to any disclaimer, the term of this patent is extended or adjusted under 35 U.S.C. 154(b) by 130 days.

(21) Appl. No.: 14/901,972

(22) PCT Filed: Jul. 4, 2014

(86) PCT No.: PCT/EP2014/064356
§ 371 (c)(1),
(2) Date: Dec. 29, 2015

(87) PCT Pub. No.: WO2015/001097
PCT Pub. Date: Jan. 8, 2015

(65) Prior Publication Data
US 2016/0153847 A1    Jun. 2, 2016

(30) Foreign Application Priority Data
Jul. 5, 2013  (EP) .................................... 13175401

(51) Int. Cl.
*G01L 1/25* (2006.01)
*G01M 5/00* (2006.01)
(52) U.S. Cl.
CPC ........... *G01L 1/255* (2013.01); *G01M 5/0066* (2013.01)

(58) Field of Classification Search
CPC ... G01L 1/25; G01L 1/255; G01L 1/12; G01L 1/125
See application file for complete search history.

(56) References Cited

U.S. PATENT DOCUMENTS

| 4,062,227 A * | 12/1977 | Heyman | ................ G01B 17/04 73/579 |
| 4,167,879 A * | 9/1979 | Pedersen | .............. G01N 29/075 73/610 |
| 4,621,530 A * | 11/1986 | Dwyer | ................ G01P 15/0975 310/329 |
| 4,624,142 A | 11/1986 | Heyman | |

(Continued)

*Primary Examiner* — Harshad R Patel
*Assistant Examiner* — Tran M Tran
(74) *Attorney, Agent, or Firm* — Fay Kaplun & Marcin, LLP

(57) ABSTRACT

A mechanical force measurement system is for measuring a force onto an object. The measurement system includes a sound wave generator which is adapted to generate a solid borne sound wave signal within the object. The system further includes a first sound wave receiver which receives a first solid borne sound wave signal based on the solid borne sound wave signal generated within the object by the sound wave generator. In order to compare a phase of the generated solid borne sound wave signal and a phase of the first received solid borne sound wave signal, and to generate a comparison signal based thereon. The system also includes a comparator unit. An evaluation unit of the system determines the mechanical force based on a data base and the comparison signal. The data base has stored a relation of a mechanical force and a comparison.

11 Claims, 9 Drawing Sheets

(56) References Cited

U.S. PATENT DOCUMENTS

| | | | |
|---|---|---|---|
| 4,716,773 A * | 1/1988 | Nonomura | G01L 3/102 324/209 |
| 4,843,346 A | 6/1989 | Heyman et al. | |
| 4,885,433 A * | 12/1989 | Schier | G06F 3/0346 178/20.04 |
| 4,899,591 A * | 2/1990 | Kibblewhite | B25B 23/1425 29/594 |
| 4,939,937 A * | 7/1990 | Klauber | G01L 3/102 73/862.333 |
| 5,043,685 A * | 8/1991 | Nyce | G06F 3/043 310/26 |
| 5,122,742 A * | 6/1992 | Hoffman | G01L 3/102 324/209 |
| 5,195,377 A * | 3/1993 | Garshelis | G01L 1/125 324/209 |
| 5,269,178 A | 12/1993 | Vigmostad et al. | |
| 5,386,727 A * | 2/1995 | Searle | G01N 29/2493 73/602 |
| 5,437,197 A * | 8/1995 | Uras | G01L 1/125 73/862.69 |
| 5,542,304 A * | 8/1996 | Sasada | B23Q 17/09 73/862.06 |
| 5,553,500 A * | 9/1996 | Grahn | G01B 17/04 73/628 |
| 5,686,672 A * | 11/1997 | Klauber | B60G 17/019 73/114.15 |
| 5,719,339 A * | 2/1998 | Hartman | G01N 3/38 73/811 |
| 5,750,900 A * | 5/1998 | Hugentobler | G01L 1/255 73/597 |
| 5,764,161 A * | 6/1998 | Schier | G01B 11/16 340/870.16 |
| 5,813,280 A * | 9/1998 | Johnson | G01L 1/255 73/643 |
| 5,877,432 A * | 3/1999 | Hartman | G01N 3/38 73/779 |
| 5,970,798 A * | 10/1999 | Gleman | G01L 5/246 73/761 |
| 6,311,558 B1 * | 11/2001 | Clark | G01L 1/12 73/597 |
| 6,424,149 B1 * | 7/2002 | Takahashi | G01N 27/72 324/209 |
| 6,742,392 B2 * | 6/2004 | Gilmore | G01N 29/2412 73/643 |
| 6,779,409 B1 * | 8/2004 | Kwun | G01L 3/102 73/862.333 |
| 6,920,792 B2 * | 7/2005 | Flora | G01N 29/041 73/622 |
| 7,347,101 B2 * | 3/2008 | Thomson | E01D 19/00 73/773 |
| 7,454,972 B2 * | 11/2008 | Heyman | G01G 9/00 73/597 |
| 7,953,562 B2 * | 5/2011 | Bulte | G01L 1/125 702/42 |
| 8,418,562 B2 * | 4/2013 | Clossen-von Lanken Schulz | G01N 29/225 264/401 |
| 9,134,188 B2 * | 9/2015 | May | G01L 1/127 |
| 9,201,048 B2 * | 12/2015 | Cheng | G01N 29/2412 |
| 9,212,958 B2 * | 12/2015 | Campbell | G01L 1/125 |
| 9,537,277 B2 * | 1/2017 | Yost | H01R 43/0486 |
| 9,645,022 B2 * | 5/2017 | Brummel | G01L 3/105 |
| 9,689,760 B2 * | 6/2017 | Lanza di Scalea | G01L 1/255 |
| 2011/0238336 A1 * | 9/2011 | Di Scalea | G01N 29/043 702/56 |
| 2015/0028859 A1 * | 1/2015 | May | G01D 5/145 324/207.15 |
| 2015/0323397 A1 * | 11/2015 | May | G01L 1/125 73/779 |

\* cited by examiner

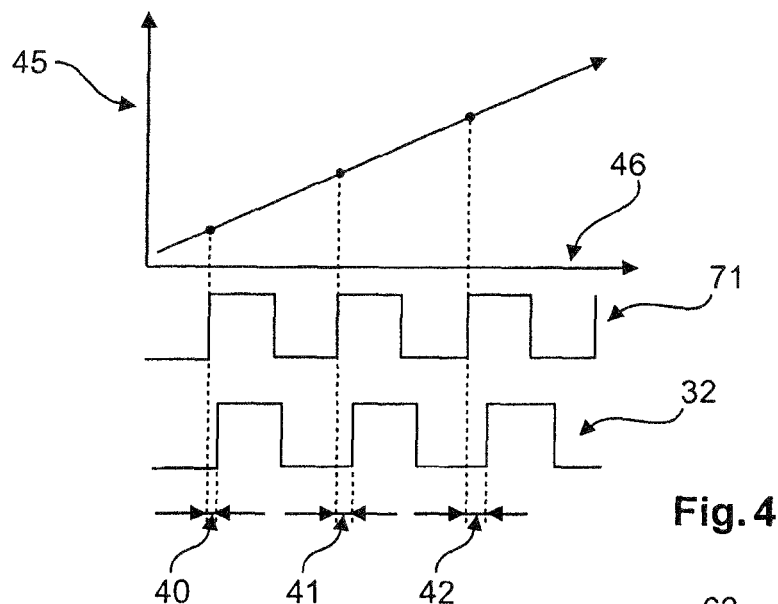
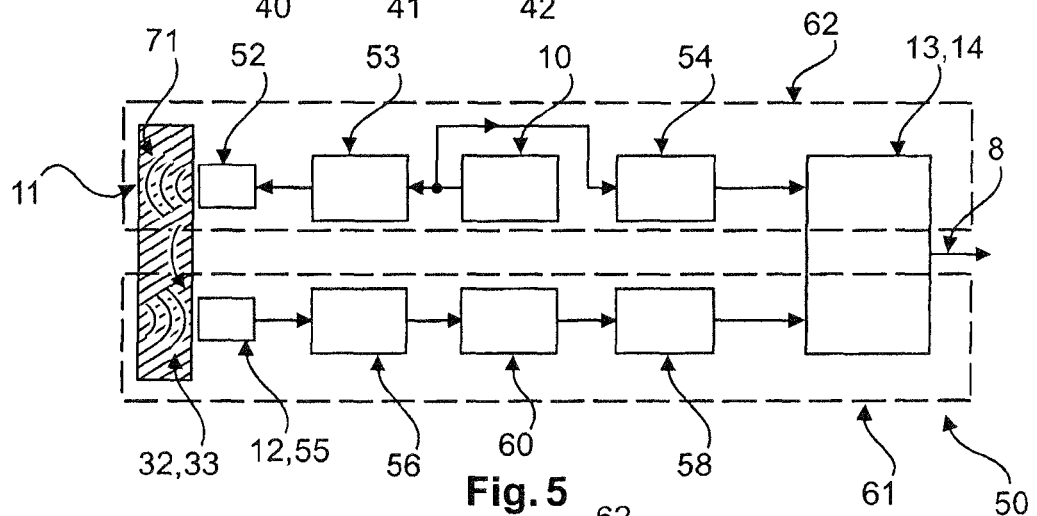
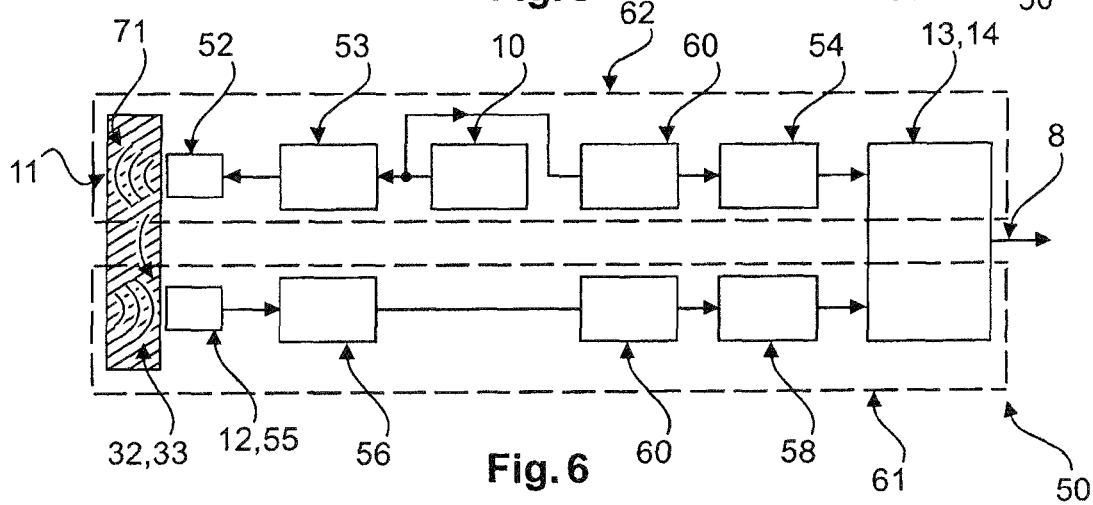

SOLID BORNE SOUND WAVE PHASE DELAY COMPARISON

FIELD OF THE INVENTION

The invention generally relates to mechanical force sensing technology. In particular, the invention relates to a mechanical force measurement system for measuring a force onto an object.

BACKGROUND OF THE INVENTION

In many technical fields, like for example in the automotive industry, in the aerospace industry as well as for machine tools and other safety-relevant industry applications, it is important to determine the forces or stresses which are applied to certain structural elements. This is required in order to provide a high degree of safety during operational conditions. Therefore, representative test objects are selected to verify the robustness or durability of such structural elements by measuring the mechanical forces applied to these structural elements. The results of the measurements can be obtained using different measuring technologies. Such measuring technologies can be based on different physical principles.

SUMMARY OF THE INVENTION

It is an object of the invention to provide an enhanced mechanical force sensing technology.

This object can be achieved by the subject matter of the independent claims. Further exemplary embodiments are evident from the dependent claims and the following description.

According to a first aspect of the present invention, a mechanical force measurement system for measuring a force onto an object is provided. The measurement system comprises a sound wave generator being adapted to generate a solid borne sound wave signal within an object to be measured and a first sound wave receiver being adapted to receive a first solid borne sound wave signal based on the solid borne sound wave signal generated within the object to be measured by the sound wave generator. The measurement system further comprises a comparator unit being adapted to compare a phase of the generated solid borne sound wave signal and a phase of the first received solid borne sound wave signal, and to generate a comparison signal based thereon. The measurement system further comprises an evaluation unit being adapted to determine the mechanical force based on a data base and the comparison signal, wherein the data base has stored a relation of a mechanical force and a comparison.

The object, also called test object or test device, may be a power transmitting shaft in a gearbox system or a drive shaft in a truck or car, for example. The test object can be a hollow shaft or a solid shaft. It can be symmetrically shaped, for example a cylindrical shaft, or it can have a rectangular shape. The test object can also be a square beam or simply a plate. The sound wave generator, which is also called actuator, can be placed at the test object such that the sound wave generator is in direct contact to the surface of the test object. The sound wave generator may also be arranged such that there is a spacing or gap, e.g. an air gap, between the test object and the sound wave generator. Solid borne sound waves can thus be introduced or inserted into the test object. The solid borne sound waves may then be transmitted within or inside the test object. In other words, the solid borne sound waves propagate or travel within the test object from a distinct point to another distinct point. In this manner the solid borne sound waves can be introduced into the test object by the sound wave generator at a certain location on the surface of the test object. Afterwards these solid borne sound waves are transmitted or conducted through the solid test object to another certain location at which the sound wave generator may be placed. The first sound receiver can be placed at the test object such that the first sound wave receiver is in direct contact to the surface of the test object but it may also be arranged such that there is a spacing or gap, e.g. an air gap, between the test object and the first sound receiver. The comparator unit can at least be connected to both sound wave generator and first sound wave receiver such that signals generated by the sound wave generator and the first sound wave receiver can be received from the comparator unit. In this manner a comparison between the phase of the signal received from the sound wave generator can be compared to the phase of the signal received from the first sound wave receiver as to obtain a comparison signal. It is also possible to arrange a plurality of sound wave generators and/or a plurality of sound wave receivers. The evaluation unit may be adapted to receive the comparison signal from the evaluation unit. With this comparison signal the evaluation unit may determine and/or evaluate the mechanical force applied to the test object by relying on data stored in a data base or data storage. The determination and/or calculation of the mechanical force can for instance be conducted by comparing the comparison signal to data or values stored in the data base. The mechanical force may be selected from the group comprising torque forces, bending forces, shear forces, axial load or push-pull forces and/or stretching.

A gap or spacing between the test object and the sound wave generator as well as between the test object and the sound wave receiver can be advantageous in case the test object is not accessible, for example.

According to an embodiment of the invention, the mechanical force measurement system further comprises a second sound wave receiver being adapted to receive a second solid borne sound wave signal based on the solid borne sound wave signal generated within the object to be measured by the sound wave generator. The comparator unit is adapted to compare a phase of the generated solid borne sound wave signal, a phase of the first received solid borne sound wave signal and a phase of the second received solid borne sound wave signal, and to generate the comparison signal based thereon.

Thus, it is possible to arrange the first sound wave receiver and the second sound wave receiver at different locations on and/or near the surface of the test object wherein near the surface means that there may be a gap between at least one of the receivers and the surface of the test object. The sound wave receivers may be arranged at different distances from the sound wave generator such that the solid borne sound wave signal generated within the test object is received by the sound wave receivers at two different times.

According to another embodiment of the invention, the sound wave generator comprises a dipole sound wave generator being adapted to generate a solid borne sound wave signal having a directional pattern within an object to be measured According to another embodiment of the invention, the sound wave generator, the first sound wave receiver and the second sound wave receiver are arranged in line, wherein an absolute distance between the sound wave generator and the first sound wave receiver differs from a distance between the sound wave generator and the second sound wave receiver.

The first sound wave receiver may for instance be arranged between the sound wave generator and the second sound wave receiver. In this manner it is possible that the solid borne sound wave is received at two different locations and therewith at two different times. Thus an additional signal which is provided to the comparator unit can be used when comparing the phases of the generated and received sound wave signals which may also provide an enhanced and reliable determination of the mechanical forces by the evaluation unit.

According to another embodiment of the invention, the comparison signal is a phase-delay differential-mode signal, and the evaluation unit is adapted to determine a phase-delay differential-mode signal condition thereof.

The sensor system design may comprise two solid borne sound wave signal receivers and one solid bourn sound wave signal actuator. The two receivers are placed with a 90 deg angle in relation to each other, taking the signal generator device as the center point for this placement definition. The receivers and actuators may be placed on a symmetrically shaped metal beam that is fixed at one end and a force is applied to the other end of the beam such that a bending force occurs in the beam. One signal receiver and the actuator can be placed in line with respect to mechanical stress lines within the test object. The other receiver may be placed perpendicular with respect to the applied mechanical stress lines in the test object. When no bending forces are applied to the beam, e. g. in a force neutral state, then the signal phase delay from the signal generator to the two signal receiver points is identical. This means that the sound waves being transmitted within the metal beam or test object may have the same speed or nearly the same speed in any direction. When applying a bending force to the test object, the signal phase delay time may change.

According to yet another embodiment of the invention, the sound wave generator comprises a controlling unit being adapted to generate a sound wave generating controlling signal, which sound wave generating controlling signal forms a base for the generated solid borne sound wave signal.

For example, the sound wave generating controlling signal may be an analogue or digitized signal. The sound wave controlling signal may trigger the solid borne sound wave. Therefore the sound wave generating controlling signal may be generated by the sound wave generator such that the sound wave generating controlling signal may as well be called sound wave generator controlling signal.

According to another embodiment of the invention, the sound wave generator comprises an electro-acoustic converter being adapted to convert the sound wave generating controlling signal into an acoustic signal, wherein the sound wave generator is adapted to couple the acoustic signal into the object to be measured so as to generate the solid borne sound wave signal within the object to be measured.

An electro-acoustic converter can be a loudspeaker, for example. Other means for converting electrical signals into acoustic signals are also possible. The electro-acoustic converter is placed near or on the surface of the test object such that the converted or acoustic signal can be introduced into the test object. Within the test object the acoustic signal, which is then also called solid borne sound wave signal, is propagated or travels in different directions. The propagation of the solid borne sound wave signal within the test object is dependent on the physical properties of the test object.

According to another embodiment of the invention, the sound wave generator comprises an electro-magnetic converter being adapted to convert the sound wave generating controlling signal into a magnetic signal, wherein the sound wave generator is adapted to couple the magnetic signal into the object to be measured so as to generate the solid borne sound wave signal within the object to be measured.

A magnetic signal can for example be provided by a DC electrically powered inductor or an AC electrically powered inductor. The electro-magnetic converter is placed near or on the surface of the test object such that the sound wave generator can introduce the converted or magnetic signal into the test object. Within the test object the magnetic signal may generate a solid borne sound wave signal due to physical effects. The propagation of the solid borne sound wave signal within the test object is dependent on the physical properties of the test object.

According to yet another embodiment of the invention, the controlling unit is adapted to generate a continuous sound wave generating controlling signal.

The continuous sound wave controlling signal may have a certain intensity level which is constant in time.

According to another embodiment of the invention, the controlling unit is adapted to generate a pulsed sound wave generating controlling signal.

Instead of a continuous solid borne sound wave signal, a single signal, for example a pulse burst signal can be used. The signal intensity for a pulsed signal can be very high with respect to the signal intensity of a continuous signal. However, the pulsed sound wave signal may have an overall energy consumption which may be lower than that for a continuous sound wave signal. This is due to a short signal pulse with a longer pause afterwards wherein during the pause the intensity of the sound wave signal is very low or even zero. Since the pulsed sound wave signal has a higher energy transfer at a distinct time it also allows to increase the spacing or gap between the signal actuator or signal receiver and the test object. This is advantageous if the test object is not accessible.

According to another embodiment of the invention, the data base is represented by a look-up table.

For this purpose data of physical and mechanical properties of different materials can be stored or deposited in the look-up table. It is also possible to store mechanical properties of different bodies, e. g. test objects with a specific shape or design. Using a look-up table, the efficiency for determining of the mechanical force applied to the test object can be enhanced.

According to another embodiment of the invention, the data base is represented by an algorithm.

Such an algorithm can for instance be used to calculate the mechanical forces applied to the test object by means of the sound wave signals. The algorithm may comprise an interpolation or extrapolation procedure for example. Other calculation methods or procedures are also possible.

According to yet another embodiment of the invention, at least one of the first sound wave signal receiver and the second sound wave receiver comprises a magnetic sensing unit being adapted to sense an inversed magnetostriction effect.

The inverse magnetostriction effect, also called Villary effect, describes the change of the domain magnetization when mechanical stress is applied to the test object. If the magnetization is increased by tension, then the magnetostriction can be positive like in pure iron, for example. If the magnetization is decreased by tension, then the magnetostriction can be negative like in nickel, for example. Thus it is possible to determine the mechanical force applied to the test object by sensing the magnetization of the test object which occurs as a result of the mechanical forces applied to the test object. In other words, the mechanical force applied to the test object can be determined by means of the inversed magnetostriction effect.

According to another embodiment of the invention, the measurement system further comprises a supporting magnetic field source providing a supporting magnetic field, wherein at least one of the first sound wave signal receiver and the second sound wave receiver is adapted to measure a modulation of the supporting magnetic field by an inversed magnetostiction effect resulting from an impact onto the object to be measured.

Using a supporting magnetic field, which is also called magnetic support field, the quality of the measurement signal can be enhanced. Such support field can be created by using a permanent magnet which may for instance be placed at the surface of the test object such that a magnetized region within the test object is generated. Magnetic support fields can also be provided by a DC electrically powered inductor or an AC electrically powered inductor. The supporting magnetic field that is passing through the surface of the test object can be modulated by the solid borne sound waves that are for instance transmitted towards the permanent magnet. A magnetic field sensing device, for example, may detect these modulations. If the solid borne sound waves are crossing the flux lines of the magnetic support field, the field that is measured by the magnetic field sensing device is modulated, like for instance in amplitude.

The actuator may for example be a pin that is accelerated towards the surface of the test object and hence represents a mechanical principle based wave actuator. At impact, the mechanical energy from the moving pin, which for instance is a hardened steel item, is transferred into the test object. A shock wave resulting from the impact is transmitted in all directions within the test object. This actuator design may require a physical contact between the actuator and the test object which is easily achievable as long as the test object is not moving or rotating in relation to the actuator.

According to another embodiment of the invention, at least one of the first sound wave signal receiver and the second sound wave receiver comprises an acoustic to electric converter being adapted to convert a solid borne sound wave within the object to be measured into an electric signal.

The originally received solid borne sound wave signal can be digitized so that a converted digital signal is generated. This can be done by using an acoustic to electric converter, for example a Schmitt-trigger circuit. By means of a pre-defined trigger level the Schmitt-trigger can for instance switch between the two digital signal states low and high wherein low characterizes the signal state if it is below the pre-defined trigger level and high characterizes the signal state if it is above the pre-defined trigger level. The signals generated by the actuator and recovered by the receiver units can both be digitized in the same manner.

BRIEF DESCRIPTION OF THE DRAWINGS

FIG. 4 shows a diagram in which the mechanical stress is plotted over the time for a test object to which a mechanical stress is applied according to an embodiment of the invention.

FIG. 5 schematically shows a diagram for basic sensor system electronics design according to an embodiment of the invention.

FIG. 6 schematically shows a diagram for basic sensor system electronics design with an additional signal filter module according to another embodiment of the invention.

DETAILED DESCRIPTION OF THE DRAWINGS

Figure 1:
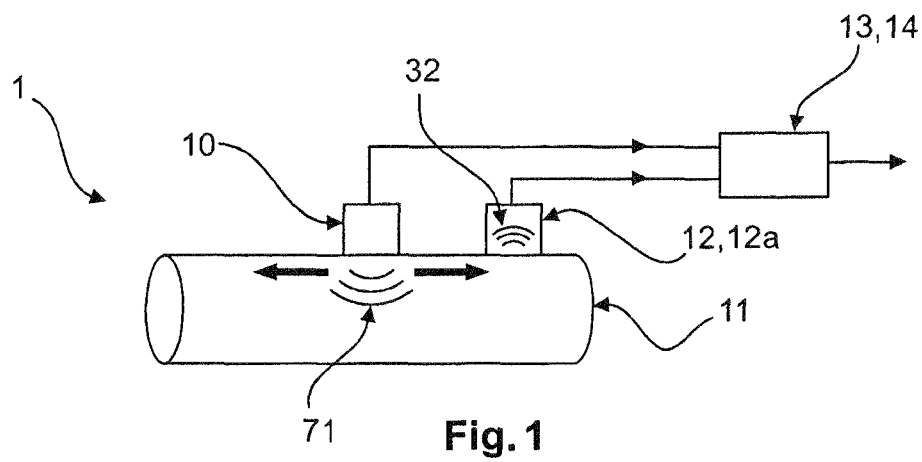
FIG. 1 schematically shows a solid borne sound wave sensor system with a single receiver according to an embodiment of the invention.

In the following a number of sensing technologies that allow measuring the mechanical stresses applied to a test object are described. The described sensing technologies are on magnetic principles and rely on the changes of the magnetic properties of a test object when mechanical stresses are applied to it. When using the term "mechanical force sensing" then this includes, but is not limited to torque forces, bending forces, shear forces, axial load or push-pull forces and/or stretching which may be due to pressure built-up in pipes. Depending on the chosen sensing technology, some mechanical forces can be detected more easily than others. The new sensing technologies described here, are solid body sound wave phase delay comparison, pulsed sound wave differential time, eddy current differential mode and magnetic signal transfer efficiency. The solid body sound wave phase delay comparison can also be called solid borne sound wave phase delay comparison.

A test object or test device is the item or object from which a measurement can be taken from. A test device can be a power transmitting shaft in a gearbox system or the drive shaft in a truck or car, for example. The test device can be tooled as a hollow shaft or a solid shaft. It can be symmetrically shaped, like for example a round shaft, or it can be a rectangle or square beam, or simply a plate.

Magnetic field sensor, magnetic field sensing device, or MFS device is a sensor that can measure the absolute magnetic field strength. This device can either be a Fluxgate device, MR (Magneto Resistance), or GMR (Giant Magneto Resistance), or a sensing device based on a Hall effect sensor or any other magnetic sensing device that is able to detect and measure with high signal resolution the magnetic field strength. Exemplarily, the magnetic field strength can be measured in the range of +/−10 Gauss or +/−1 mT. Even if the following description refers to a Fluxgate sensor system using an inductor with core and at times an inductor without core, any absolute measuring magnetic field sensing device can be used.

At first, the solid borne sound wave phase delay comparison is described. Sound waves that travel inside through a test object in a specific direction change their travelling speed in relation to the mechanical stresses that are applied to the test object. It is not required or wanted that the sound waves are travelling through air. The idea is that the sound waves which can be created by an actuator, and detected and measured by a receiver are travelling inside the test object at relatively high speeds. Since these sound waves are travelling within the test object, they are called solid borne sound waves or solid bound sound waves, or in short SBSW. Changes in the speed with which these solid bound sound waves are travelling from the actuator to the receiver can be measured by comparing the two signal phases with each other, e. g. comparing the actuator signal phase with the receiver signal phase. By doing so, the time delay between these two signal phases will be determined.

In a minimum configuration of an SBSW phase delay comparison mechanical force sensor, the sensor system comprises a solid borne sound wave generator, also called actuator, and at least one solid borne sound wave signal detector or receiver. It should be mentioned that critical features of the sensor system, like for instance offset drift, operating temperature related signal drift, etc. can be tuned or adjusted, especially when using more than one receiver. It is recommended to use at least two independently working signal receivers and to use phase-delay differential-mode signal-condition electronics. This will be described and further explained later on.

FIG. 1 shows the basic design of a single receiver SBSW sensor system 1. The signal 71 generated by the solid borne sound wave generator 10 which is inserted into the test object 11 by the actuator, and the signal 15 detected by the signal receiver device 12, are fed into a signal phase delay comparator 13. Changes in the signal phase delay time are a measurement of the mechanical forces applied to the test object 11. The sensor electronic is basically a signal-phase comparison circuit that will quantify the phase delay between the SBSW generator signal 71 coming from the actuator and from at least one receiver device 12. In case two or more signal receivers 12 are used, they may be placed at different locations in relation to the actuator at the surface of the test object 11.

The following description gives a summary of the operational principle and critical sensor system design options. Solid borne sound waves can be generated in several different ways, like for example magnetically using the magnetoelastic and magnetostriction effect, mechanically, by resonance effects, etc. Depending on the chosen operational principle of the actuator, this sensing technology can be used on static test objects or on moving or rotating test objects. There are numerous ways about how to design and produce a solid borne signal wave receiver or a solid borne sound wave receiver 12. The signal wave 71 generated by the generator 10, i. e. actuator, and detected by the receiver 12 can be phase compared measuring the small time delays caused by these signals arriving at the comparator 13. When mechanical stresses are applied to the test object material, then the signal phases will shift resulting in added or reduced time delays. This includes mechanical stresses caused by torque, bending, axial load (push-pull), pressure changes and shear forces, for example.

Different sensor system design options can be considered when building an SBSW sensor, i. e. the solid borne sound wave phase delay comparison sensing technology can be realized by choosing between different design options. The different design options rely on the comparison of the signal phase delay measurements taken between actuators and signal receivers 12. Different design options may be linked together with each other. The different design options of a solid borne sound wave sensor system 1 may comprise a mechanical principle based transmitter and/or a magnetoelastic principle based transmitter. The magnetoelastic principle based transmitter may for instance be a pulsed signal wave generator or a continuous signal wave generator. The pulsed signal wave generator can have two or more operational modes. The first pulsed signal wave generator describes a direct mode operation with one transmitter or actuator and one receiver. The second pulsed signal wave generator describes a differential mode operation with one transmitter or actuator and two or more receivers. In both cases solid borne sound wave receivers are employed. The solid borne sound wave receivers 12 may rely on a natural occurring magnetic rest field or they may use a supporting magnetic field. The supporting magnetic field can be provided by a permanent magnet, a DC electrically powered magnet and/or an AC electrically powered magnet. In the following the design options are explained and shown in the appropriate details.

The effect used for this sensing technology is similar to the one used when measuring linear distances in ferro-magnetic objects, like in a stretched wire. In this case a very strong and aggressive magnetic pulse is generated and transferred to the surface at a specific location of the stretched wire. With this short and intense magnetic pulse the physical shape or volume of the location that is exposed to this pulse can be modulated (magnetostriction effect). Magnetostriction is one of the physical properties of ferromagnetic materials that causes them to change their shape or dimensions during the process of magnetization. Hence, a mechanical shock wave has been generated, which is called in this document a solid borne sound wave or SBSW 71. This SBSW 71 is then travelling in the wire in both directions and is reflected back when having reached the end of that wire, for example. Assuming that the speed with which this SBSW 71 is travelling through the wire is known, the distance from the actuator point, where the solid borne sound wave 71 is inserted into the wire, to the ends of the stretched wire can be determined by measuring the time delay between the actuator signal generation and the arrival of the signals at the wire end.

In the described mechanical force measurement system, e. g. solid borne sound wave sensor system 1, a short and intense magnetic pulse can be generated at the surface of the test object 11 where the measurement takes place. This is here called the actuator location. The resulting mechanical sound wave will then travel away from the actuator in all directions within or inside the test object 11. The test object 11 can be a metal plate, a symmetrically shaped shaft, or a tube for example. When relying entirely on the magnetoelastic and magnetostriction effects, then the test object 11 should be tooled from ferro-magnetic material. The speed with which the sound wave signal 71 is travelling away from the signal generation point 10, e. g. from the actuator, can be measured by at least one or more than one sensors that are placed around the signal source. These sensors are also called receivers 12. In this document only the sound wave signals 71 that are travelling away from the signal source, e. g. from the actuator, are considered. In reality the sound wave signals are reflected back when reaching the borderline of the metallic test object 11.

Figure 2:
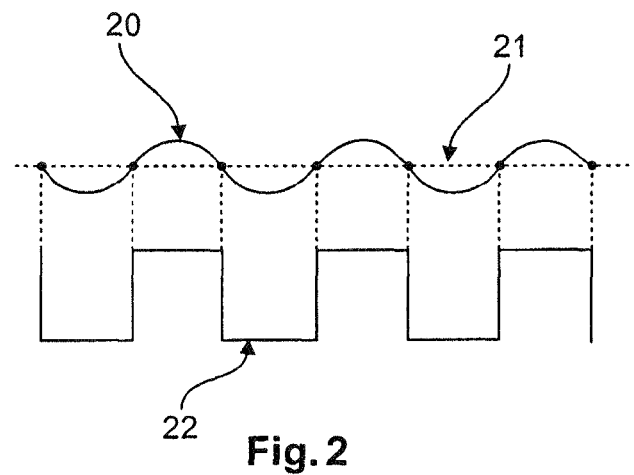
FIG. 2 shows an originally received signal and a converted digital signal according to an embodiment of the invention.

To simplify the signal phase comparison process, the originally received signal 20 will be digitized so that a converted digital signal 22 is generated, as shown in FIG. 2. This can be done by using a simple Schmitt-trigger circuit, for example. A pre-defined trigger level 21 may cause the Schmitt-trigger or comparator 13 to switch between the two digital signal states "low" and "high". The signals generated by the actuator and recovered by the receiver units 12 can be treated in the same way.

Figure 3:
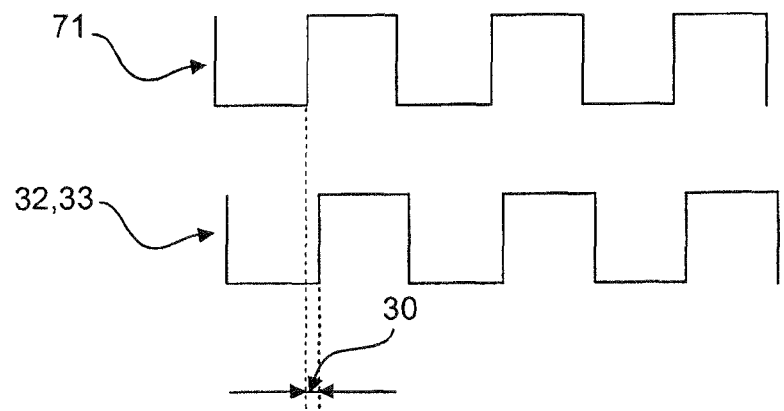
FIG. 3 shows a digitized generator signal and a digitized receiver signal according to an embodiment of the invention.

As shown in FIG. 3, both signals, e. g. the generator signal 31 and the receiver signal 32 can be digitized and then compared with each other. Changes in the time delay difference ($t_1$) 30 are subject to the applied mechanical forces to the test object 11. There are numerous ready-made electronics circuits (ICs=Integrated Circuits) that perform a signal phase comparison. The output signal of such signal phase comparison circuit can be an analogue voltage, for example. An increase in the signal phase delay may result in an increase of the signal output voltage, for example.

The mechanical stress vs. time diagram shown in FIG. 4 visualizes that when the mechanical stresses applied to the test object 11 increases, then the signal phase shift 40, 41, 42 will also increase. The horizontal axis 46 indicates the time whereas the vertical axis 45 indicates the mechanical stress, e. g. torque or bending. The basic sensor design, as shown earlier, may not be able to differentiate between positive and negative mechanical stresses. This specific sensor design can detect and measure absolute mechanical stress forces without polarity sign.

The signal conditioning and signal processing electronics are described in the following. Preferably, a mixed signal electronics circuit design is applied, in which a part of the circuit can be built using an analogue design and the other half can be a pure digital design.

FIG. 5 shows a diagram with a basic sensor system electronics design for a single-channel-receiver solution 50 in comparison to a multichannel-receiver solution. The single-channel receiver solution 50 comprises an actuator 52, which is also called solid borne sound wave actuator, a power driver 53 a signal generator 10 and a first Schmitt-trigger 54 in the generator signal path 62. It further comprises a sensor 55, which is also called solid borne sound wave detector, a signal amplifier 56, a band-pass filter 60 and a second Schmitt-trigger 58 in the receiver signal path 61. The main function of this circuit design is to measure the time delay, e. g. the signal phase measurement or group delay, between the generator 10 and the receiver. Caused by signal reflections and other mechanical action based signal interferences, the recovered signal can be processed before passing it on to the differential phase delay measurement module 13, 14. The differential phase delay measurement module 13, 14 may generate a comparison signal 8 which is also called sensor signal output. The use of any signal filter circuitry, which can be analogue or digital, may cause a further phase delay in the received signal. Such additional phase delay may be subject to temperature changes that the filter circuitry may be exposed to when for instance using an analogue filter design.

FIG. 6 shows how unwanted effects of none-symmetrical signal phase changes can be reduced. Such none-symmetrical signal phase changes may for instance be caused by changes of the operating temperature that may act on the electronic circuit. Hence, it may be beneficial to use an additional signal filter module 60, e. g. a band-pass filter 60 in the generator signal path 62. Preferably, the additional signal filter module 60 has an identical design as the filter module 60 used in the receiver signal path 61.

The differential phase delay measurement module 13, 14 can be a ready-made IC which is commercially available. It can also be a software driven function in a digital controller circuit using controller internal functional support hardware, like timer circuits. It can further be a custom built solution.

There are more than one different actuator designs available to start a solid borne sound wave 71 inside the test object 11. The following lists and describes a few designs for such a solid borne sound wave actuator 52. In a first example a magnetic principle based actuator is described. When using test objects tooled from ferro-magnetic objects, then a sudden and large magnetic signal pulse, generated at the surface of the test object 11, may cause a magnetostriction reaction. This means that very locally, where the magnetic pulse enters the test object 11, the material of the test object 11 changes its physical volume. This sudden change in volume, i. e. expanding and contracting in a particular direction creates a shock wave that is then travelling in all directions, starting from where the wave has been generated.

This principle can used in magnetostriction based linear position sensors, in which such a magnetically generated mechanical shock wave is travelling forward and backward inside a stretched wire in order to measure the length of the stretched wire. In this manner both distance and applied mechanical force can be measured.

The benefit of using a mechanical shock wave generator which is based on a magnetic principle is that the actuator 52 does not have to touch the test object 11 for the signal wave energy transfer. Between the surface of the wave actuator 52 and the surface of the test object 11 can be an air gap, e. g. spacing, from zero millimeter to a few millimeter.

Figure 7:
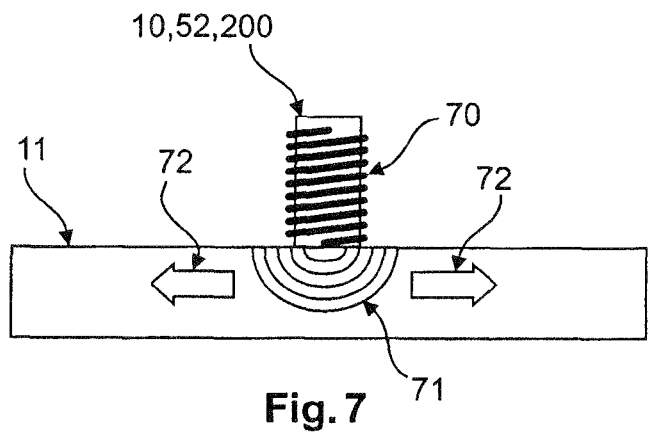
FIG. 7 schematically shows a cylindrically shaped inductor on a ferro-magnetic plate according to an embodiment of the invention.

FIG. 7 shows a cylindrical shaped inductor, e. g. coil 70, in which a ferro-magnetic core can be used to create a 360 deg uniform solid borne sound wave 71. In this example the actuator coil 70 is placed with one end standing on a ferro-magnetic plate, wherein the ferro-magnetic plate is the test object 11. A large current pulse can be conducted through this coil 70 to generate the mechanical shock wave signal.

Figure 8:
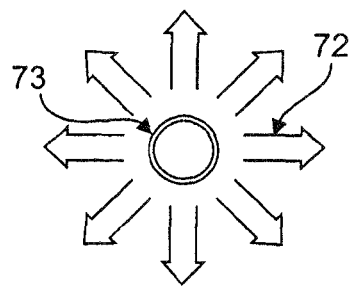
FIG. 8 schematically shows the spreading of a solid borne sound wave signal in different directions according to an embodiment of the invention.

FIG. 8 shows that the solid borne sound wave signal can be spread away from the actuator coil 70, e. g. from the signal source 73 with nearly identical intensity in all directions 72.

Figure 9:
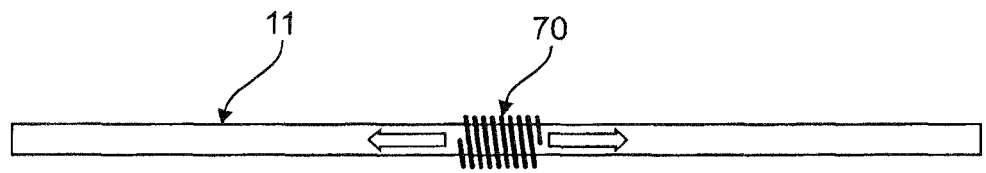
FIG. 9 schematically shows how a solid magnetostriction based solid borne sound wave generator according to an embodiment of the invention.

FIG. 9 shows a typical design of a magnetostriction principle based solid borne sound wave generator in which a coil 70 is wound around the test object 11 itself. In most cases the test object 11 is a stretched wire that can be used to measure the distance between two locations, for example between the actuator 52 and the receiver device 12. The receiver device 12 is not shown in the drawing above.

Figure 10:
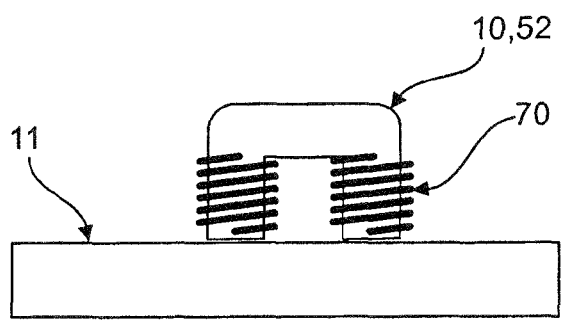
FIG. 10 schematically shows an electrically powered actuator with two magnetic poles facing a surface of a test object according to an embodiment of the invention.

When generating a directed magnetostriction signal wave, it is possible to emphasize the direction in which the solid borne sound wave 71 travels within the test object 11. Such design is more energy efficient and the received signal is stronger providing an improved signal-to-noise ratio. In the example shown in FIG. 10, both magnetic poles from the electrically powered actuator 52 are facing the surface of the ferro-magnetic test object 11.

Figure 11:
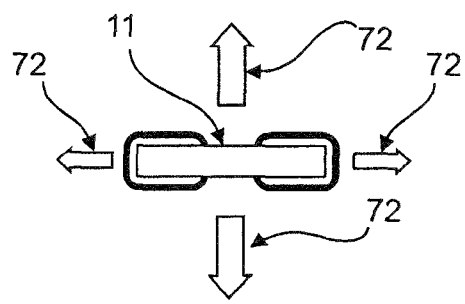
FIG. 11 schematically shows the intensity of a solid borne sound wave in different directions according to an embodiment of the invention.

In FIG. 11 the size of the arrows, which can be seen from a top view perspective of the test object 11, symbolize the intensity and direction 70 of the generated solid borne sound wave 71. The thicker the arrows, the higher the intensity.

The second example describes a mechanical principle based wave actuator. This actuator design uses a mechanical device, like for example a pin that is accelerated towards the surface of the test object 11. At impact, the mechanical energy from the moving pin, which for instance is a hardened steel item, is transferred into the test object 11. A mechanical triggered shock wave can travel in all directions within the test object 11. The mechanical principle based sound wave actuator may require a physical contact between the actuator 52 and the test object 11. This is easily achievable as long as the test object 11 is not moving or rotating in relation to the actuator 52.

Figure 12A:
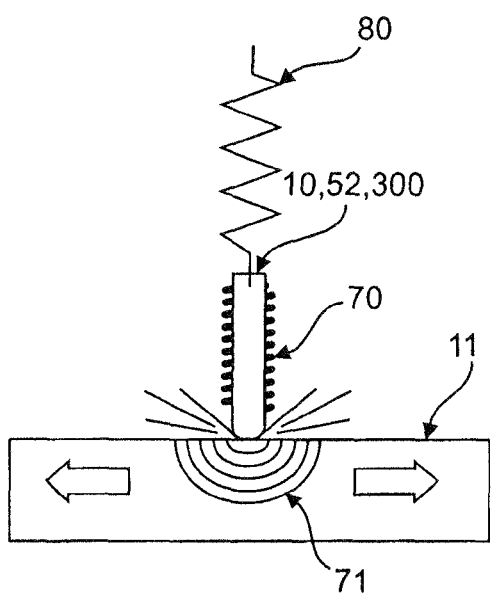
FIG. 12A schematically shows a physical impact of an actuator at the surface of a test object according to an embodiment of the invention.
Figure 12B:
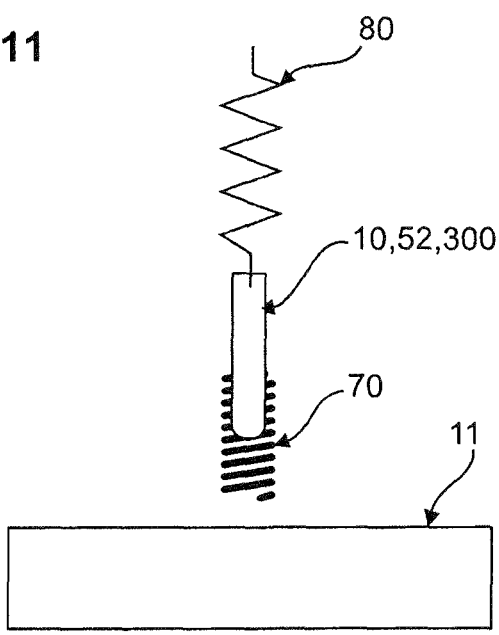
FIG. 12B schematically shows an actuator pulled away from a test object by a spring mechanism according to an embodiment of the invention.

As shown in FIG. 12A the inductor or coil 70 is attracting and accelerating the actuator core 52, e. g. a ferro-magnetic piston, when an electric current is conducted through the inductor. This leads to a physical impact of the actuator core 52 or piston at the surface of the test object 11. The created solid borne sound wave 71 is then spreading out in all directions inside the test object 11. As shown in FIG. 12B, the actuator core 52 or piston will be pulled back by a spring mechanism 80, as soon as the electric current flowing through the inductor is switched off.

The third example describes a continuous magnetic wave generator. Instead of using a single pulse energy transfer, a continuous wave form energy transfer can be chosen. Good results can be achieved when identifying and choosing the resonance frequency of the test object 11 in relation to this measurement method and application and to drive the wave actuator accordingly. Some unpleasant results may be the consequence when choosing signal frequencies that are in the audible range. In such a case the mechanics of the actuator and its mounting type should therefore be chosen carefully in order to reduce or even to eliminate audible sound waves above a certain energy level.

In the following a few designs for a solid borne sound wave receiver 12 are described. As with the actuator 52, there are several different designs available for the solid borne sound wave receiver 12. These receiver designs can be divided in three groups. The first group is represented by magnetic principle based receivers which are based on the inverse magnetostriction effect, also called the Villary effect. The second group is represented by mechanical principle based receivers, like for instance a microphone, an accelerometer, etc. The third group is represented by optical principle based receivers, e. g. laser distance sensors.

At first, the magnetic principle based receiver design is described. Using the magnetic principle based solution, it may be much easier to design and produce a true non-contact sensor solution. However this requires that the test object 11 is tooled from a ferro-magmatic material. The magnetostriction effect describes the change of the shape of a ferro-magnetic material during its magnetization. The inverse magnetostriction effect describes the change of the domain magnetization when mechanical stress is applied to the test object 11. The polarity of the magnetic signal change is subject to the material used in the test object 11. The polarity is positive when using pure iron, i. e. the magnetization is increased by tension. The polarity is negative when using Nickel, i. e. the magnetization is decreased by tension.

The solid borne sound wave signal 71 is much easier to detect and to measure when working with a supporting magnetic field. The flux-lines of this supporting magnetic field travel through the location where the receiver signal is picked up by the receiver sensing module. In the description an inductor $L_{RS}$ is used as the receiver sensing module. The letter L indicates that an inductor is used and RS stands for Receiving Sensor. The supporting magnetic field causes a reaction at the receiver sensing module. This reaction changes in amplitude and in its direction it is travelling through the test object 11 when a solid borne sound wave 71 is hitting and travelling through the supporting magnetic field. The supporting magnetic field can be a constant magnetic field. It may have an identical strength and identical orientation or direction with which it is travelling through the test object 11 or it can be an alternating magnetic field that is changing in its strength and in its direction.

There are several options available for the creation of a constant and not changing magnetic field as the supporting magnetic field. A constant and not changing magnetic field can be created by a permanent magnet which is placed nearest the test object 11 where the receiver 12 is placed. Such a constant magnetic field source can be created by using a synthetic material, permanent magnet, or a DC electric powered bar magnet, e. g. an inductor with core. A constant and not changing magnetic field can also be created by a permanent magnetization of the test object 11. This requires a ferro-magnetic material with magnetic retention features.

The other option is to use an alternating magnetic field source which can be electrically generated and that can be placed nearest the test object 11. The chosen absolute magnetic field strength of the supporting magnetic field is critical. It may be strong enough to have the desired effect at the magnetic field sensing device, but may also be weak enough so that the path with which the magnetic flux lines are travelling through the test object 11 at the receiver location are still influenced and changed by the solid borne sound wave 71 coming from the actuator. Many different factors can have an influence on what the best field-strength value may be. However, a good value is in the area of +/−2 Gauss to +/−30 Gauss or +/−0.2 mT to +/−3 mT, which is effectively measured directly at the surface of the test object 11.

Figure 13:
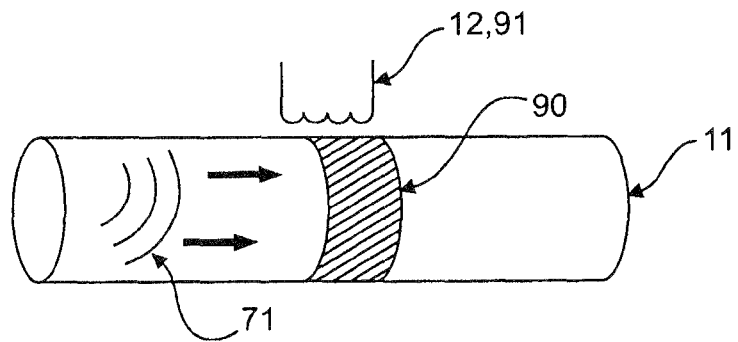
FIG. 13 schematically shows a receiver placed near to a permanently magnetized test object according to an embodiment of the invention.

FIG. 13 shows a permanently magnetized test object 11 at the location where the receiver is placed. This permanently magnetized area 90 is indicated by the shaded area in FIG. 13. The permanent magnetization 90 is effectively the magnetic support field that is travelling through the sensing region. It is mentioned in this description that the magnetic field strength of this support field does not change over time and that the flux lines run at the same path through the test object 11. Many different magnetic processing methods which result in a permanent magnetization of the test object 11 are available.

Nearest the permanently magnetized location 90 of the test object 11, a magnetic field sensing (MFS) device 91 is placed. The MFS device 91 can be one of many different sensor solutions, including but not limited to Hall effect, MR, GMR, Inductor, and Fluxgate sensors. In this example an induction is used with a specification that is suitable for the chosen solid born sound wave generator frequency. The placement direction of the magnetic field sensing device 91 is crucial. The sensitivity direction of the MFS device 91 may be arranged such that a part of the magnetic field created by the supporting magnetic field can be easily detected and accurately measured. However, if the MFS device 91 is placed in such way that the supporting magnetic field is causing the largest possible signal at the MFS device 91, then changes caused by the sold borne sound wave 71 may be very difficult to spot and to resolve by the MFS device 91.

Figure 14:
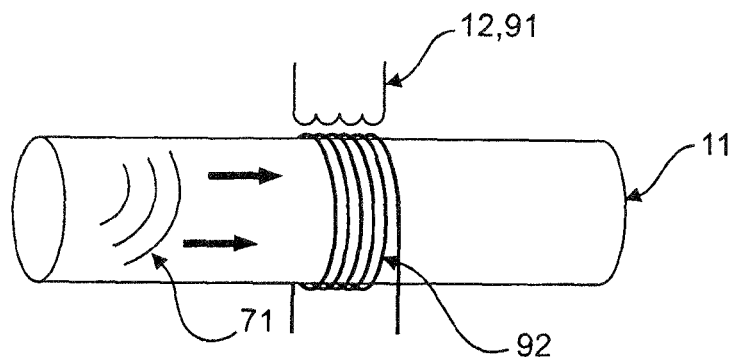
FIG. 14 schematically shows an electrically powered coil generating a supporting magnetic field according to an embodiment of the invention.
Figure 15:
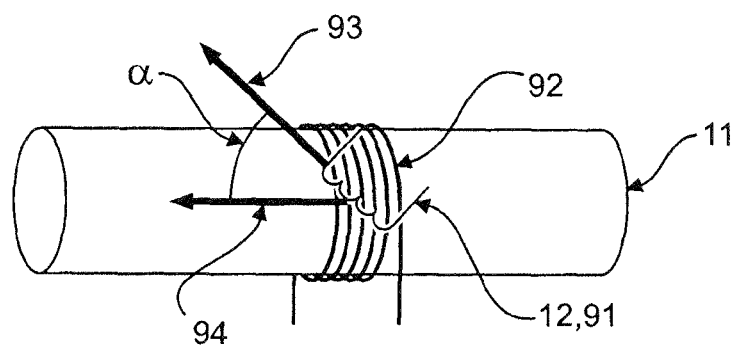
FIG. 15 schematically shows an arrangement of magnetic axes of a magnetic field sensing device and a support field generator coil according to an embodiment of the invention.

FIG. 14 shows a receiver design example in which the supporting magnetic field is generated by an electrically powered coil ($L_{RFG}$) 92 that is wound around the test object 11 itself, and with this using the test object 11 to create a weak bar magnet. L again indicates an inductor and RFG stands for Receiver Magnetic Field Generator. The orientation and exact location of the MFS device ($L_{RS}$) 91 is crucial. Best results are achieved when the MFS device ($L_{RS}$) 91 is placed in relation to the support field generating coil 92 such that it is detecting and measuring less than 10% of the field amplitude of the otherwise possible maximum field amplitude it could detect and measure when placed differently in relation to the support field generating coil 92. This means that the MFS device 91 may be placed with an angle α in relation to the magnetic axis of the magnetic field generating inductor or bar magnet in order to achieve optimal signal-to-noise ratio. This aspect is shown in FIG. 15. The placement of the MFS device 91 in relation to the support field generator coil 92 is critical and should be mechanically stable; i. e. it should not be changed after this sensor system has been calibrated.

FIG. 15 shows how to achieve the best possible signal-to-noise ratio, e. g. the largest possible factor, and with this a good receiver signal. Therefore, the magnetic axis 93 of the receiver MFS device 91, which in this example is an inductor $L_{RS}$, should not be the same as the magnetic axis 94 of the supporting field generator coil ($L_{RFG}$) 92. However, this angle should not reach 90 deg since the detectable signal would become very small or nearly zero then and with this the signal-to-noise ratio would become very unfavorable.

Figure 16:
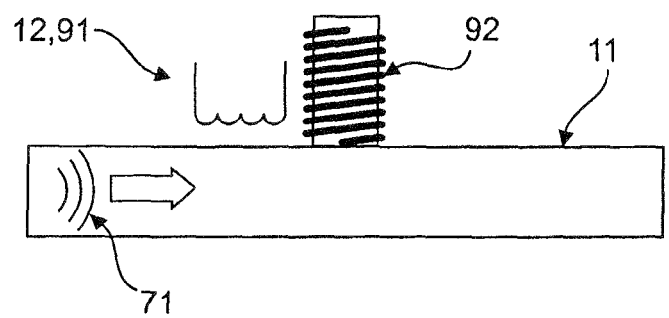
FIG. 16 schematically shows an electric-current-powered inductor for generating a magnetic support field in a test object according to an embodiment of the invention.

FIG. 16 exemplarily shows how the magnetic support field is generated by an electric-current-powered inductor with core that is placed with one end of the magnetic pole nearest to the location where the receiver picks up the solid borne sound waves 71. The receiver's MFS device 91 can be placed nearest to the end of the electric powered magnet that is facing the test object 11. As explained earlier, the angular orientation of the MFS device 91 in relation to the field lines emanating from the electrically powered support field generating coil 92 is crucial to achieve best signal-to-noise ratios.

Figure 17:
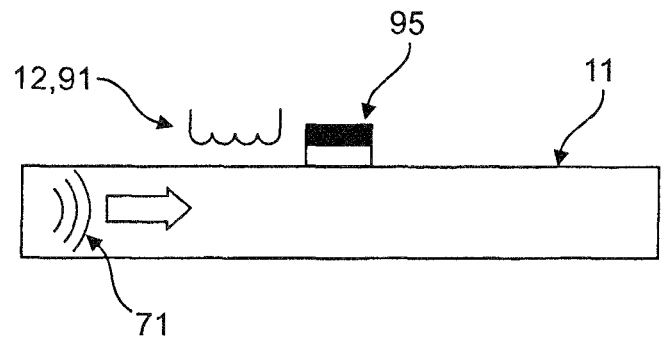
FIG. 17 schematically shows an electric-current-powered magnet for generating a magnetic support field in a test object according to an embodiment of the invention.

The electric-current-powered magnet which is used to create the support field can be replaced by a permanent magnet 95 as shown in FIG. 17. The magnetic field that is passing through the surface of the test object 11 can be modulated by the solid borne sound waves 71 that are travelling towards the permanent magnet 95. The MFS device ($L_{RS}$) 91 may pick-up these modulations which are then passed on to the receiver electronics. As before, the exact orientation of the MFS device 91 decides about the signal-to-noise ratio of the measurement signal.

Figure 18:
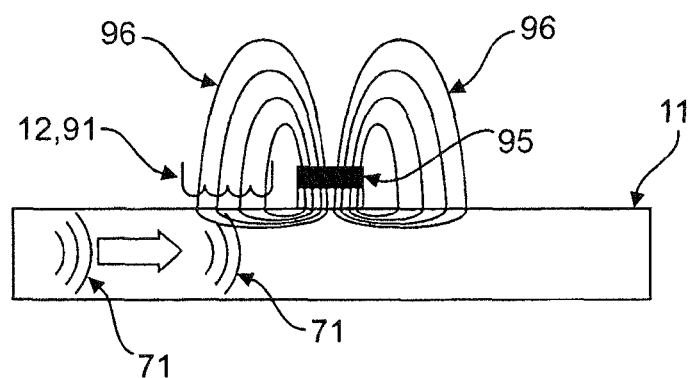
FIG. 18 schematically shows the crossing of magnetic support field flux lines and solid borne sound waves in a test object according to an embodiment of the invention.

FIG. 18 shows how solid borne sound waves 71 travelling through the ferro-magnetic test object 11 cross the area in which the supporting magnetic field 96 created by a permanent magnet 95 is also travelling through the test object 11. The effect of the supporting magnetic field 96 can be detected and measured by the externally placed receiver sensing coil, e. g. MFS device 91, placed nearest to the permanent magnet 95 and nearest to the surface of the test object 11. The moment, at which the solid borne sound waves 71 are crossing the support field flux line 96, the field that is measured by the external MFS device 91 is modulated, like for instance in amplitude.

Above a number of different receiver designs are proposed and explained. Other designs are possible as well and may either be based on using a permanent magnet, and electrically powered magnet which can be DC or AC powered, or may rely on a magnetic field that is stored permanently inside the test object 11 itself.

The following describes a background magnetic field as the support field. In most applications the test object 11 will be exposed to the Earth's magnetic field and other magnetic field sources as well. This means that there may be a natural source available for the support field required by the receiver system. However, the amplitude of the naturally occurring background magnetic field is very weak and may change under certain instances, like for instance when turning or changing the orientation of the test object 11. The presence of the naturally occurring background magnetic field can be sufficient for the receiver to function. But since the naturally occurring background magnetic field can be relatively unreliable, so will be the mechanical force measurements.

The following describes the mechanical principle based receiver design. By attaching a microphone-like device at the surface of the test object 11, SBS-Waves 71 can be detected and measured very easily. This solution is suitable as long as it is allowed to physically attach the microphone onto the test object 11. This may also cause some restrictions in relation to a rotating test object 11. As an alternative to a microphone, an accelerometer can be used as well. The mechanical shock wave or SBSW 71 travelling through the test object 11 causes a signal change at the accelerometer when the SBSW 71 has reached the accelerometer. As with the microphone, the accelerometer may be in direct contact to the surface of the test object 11.

The following describes the laser or optical principle based receiver design. As the mechanical shock wave is travelling through the test object 11, it may cause changes in the dimensions of the test object 11 that can be measured at the surface of the test object 11. Pointing an optical principle based, e. g. a laser based precision distance measurement system towards the surface of the test object 11, allows to detect and to measure when the SBSW 71 is passing through that location. This optical principle which is a true non-contact receiver design solution can be used for static and for moving or rotating test objects 11.

The following describes contact versus non-contact sensor systems. At first a magnetoelastic actuator device is described. A magnetoelastic principle based actuator design may provide the best signal quality at the signal receivers when the signal transmitter, e. g. actuator and generator, and signal receiver are in physical contact with the test object 11. The signal transfer efficiency which is represented by the ratio between the generator signal amplitude and the receiver signal amplitude change nearly exponentially when there is a gap or spacing between the sensing devices, like for instance receiver or transmitter and the test object 11. The type of the solid borne sound wave generator decides about the maximum distance or spacing that can be achieved between the surface of the test object 11 and the surface of the sensor devices. For example, it may not be to develop and build a non-contact sensing solution when using a mechanical principle with pure mechanical principle based receiver modules.

In this part a physical sensor assembly is described. As the distance between the signal wave generator and the signal receiver is crucial, it is preferred to place the sensing devices, e. g. signal wave actuator and signal wave receiver, in one and the same housing which is here called the sensing module. A change of the distance between the signal wave actuator and the signal wave receiver may directly influence the signal phase delay time. The larger the distance between the physical signal wave actuator and the signal wave receiver, the larger the signal phase delay may become. To avoid complicated and probably costly compensation methods, it is preferred to avoid that the spacing or distance between actuator and receiver can change during the operation of the sensor system. This can be achieved by an appropriate design.

Figure 19:
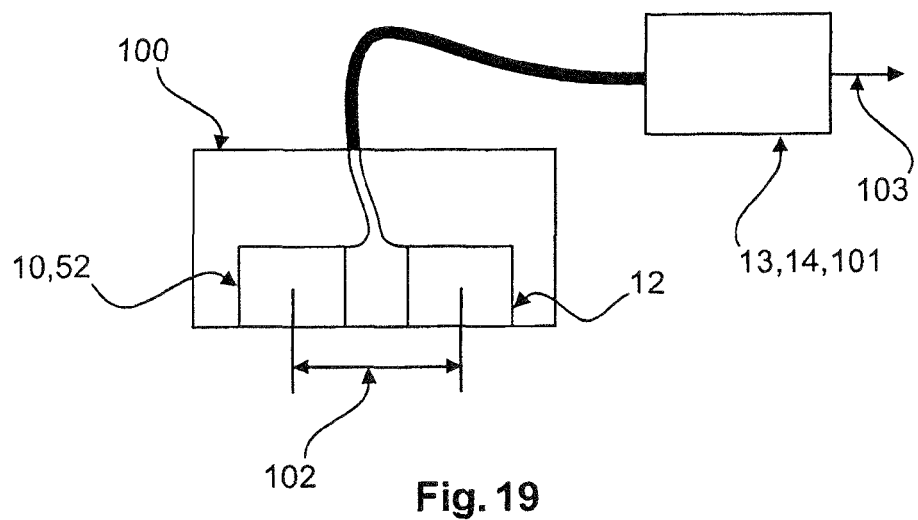
FIG. 19 schematically shows a sensing module which is connected to sensor electronics according to an embodiment of the invention.

As shown in FIG. 19, the sensor electronics 101 can be placed inside the sensing module 100, or can be placed separately in their own housing. Placing the sensor electronics 101 within the sensing module 100 is advisable when the mechanical stresses and the operating temperature range are not exceeding certain limits. FIG. 19 also shows the arrangement of the actuator 52 and the receiver 12 as well as the effective distance 102 between the actuator 52 and the receiver 12. Also shown is an output signal 103 provided by the sensor electronics 101.

In the following the differential mode signal comparison is described. Till now the basic sensor system design that has been described, comprises one solid borne sound wave signal generator device 10 and one solid borne sound wave signal receiving device 12. A more sophisticated and more complex sensor system design comprises two solid borne sound wave signal receivers 12 and the required solid bourn sound wave signal actuator. The two receivers 12 are placed with a 90 deg angle in relation to each other, taking the signal generator device 10 as the center point for this placement definition.

The function and features are explained by means of a symmetrically shaped metal beam that is held or mounted at one end, and bending forces are applied to the other end of the beam. When no bending forces are applied to the beam, e. g. force neutral state, then the signal phase delay from the signal generator to the two signal receiver points is identical ($t_{10} = t_{20}$). This means that the sound waves travelling through the metal object, which is identified as the test object 11, may have the same speed or nearly the same speed in any direction. It should be mentioned that the descriptions in this document ignores unwanted effects caused by reflections of the sound waves at the edges of the test objects 11. It may be easier dealing with those signal distorting reflections when using pulsed wave signals which will be described later.

Figure 20:
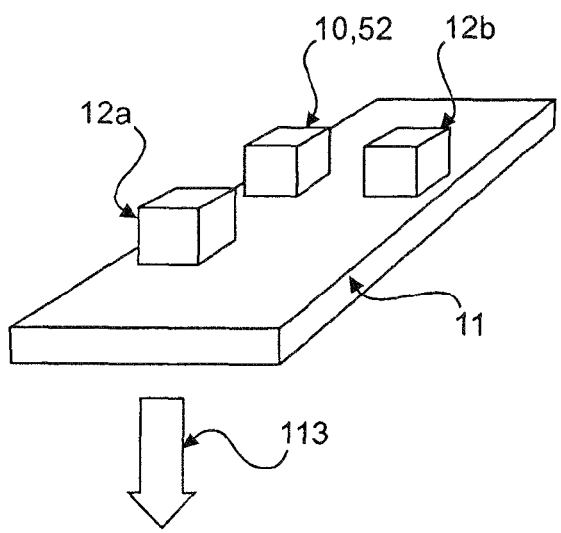
FIG. 20 shows a perspective view of a sensor system design for measuring mechanical bending forces according to an embodiment of the invention.
Figure 21:
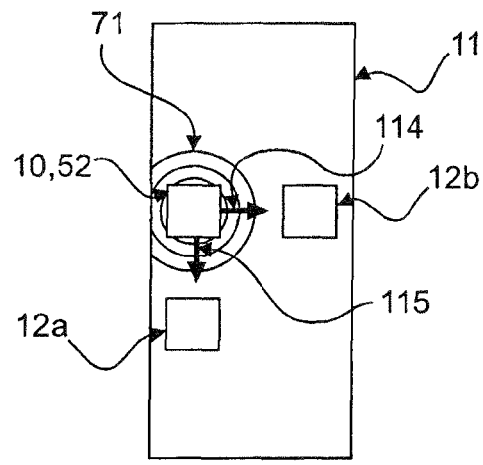
FIG. 21 shows a top view of a sensor system design for measuring mechanical bending forces according to an embodiment of the invention.

FIG. 20 shows a perspective view of a simple sensor system design to measure mechanical bending forces using two signal receivers 12a, 12b that are placed in a 90 deg angle when taking the signal wave actuator 52 as the center point for this placement definition. When applying a bending force 113 to the test object 11, the signal phase delay time $t_{10}$ changes, i. e. $t_{10}$ becomes longer or shorter, depending on which side of the test object 11 the receiver 12 is placed. The signal receiver 12a is placed in-line in relation to the mechanical stress lines within the test object 11. In contrast, the signal phase delay time $t_{20}$ remains nearly constant. The signal receiver 12b is placed perpendicular in relation to the applied mechanical stress lines in the test object 11. The horizontal arrow 114 in FIG. 21 indicates the direction in which the signal phase delay time $t_{20}$ is measured and the vertical arrow 115 indicates the direction in which the signal phase delay time $t_{10}$ is measured.

If the objective is to measure bending forces, then the signal measured by the receiver 12 can be used to define the zero bending-force offset point. The difference between the signal phase delays $t_{10}$ to $t_{20}$ are then a measurement of the applied mechanical bending forces. When keeping the distance between the signal wave actuator 52 and each of the two signal receivers 12a, 12b identical, then this design may eliminate most unwanted effects caused by changes in operating temperatures and other environmental effects.

Figure 22:
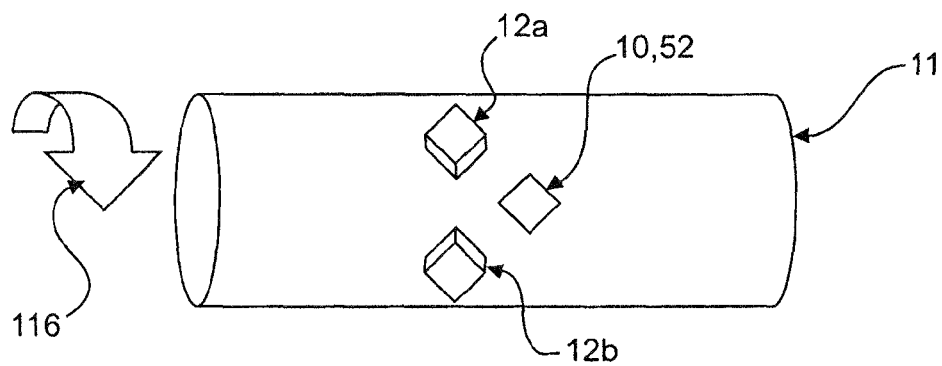
FIG. 22 shows a perspective view of an actuator sensor arrangement for measuring mechanical torque forces according to an embodiment of the invention.
Figure 23:
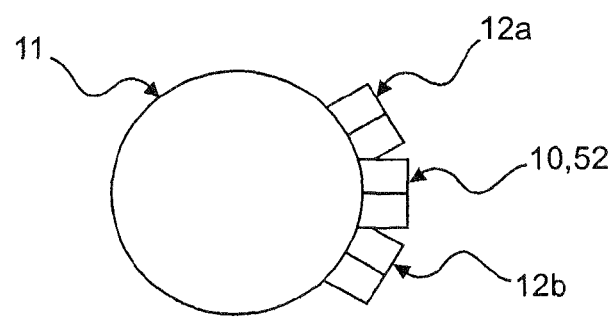
FIG. 23 shows a side view of an actuator sensor arrangement for measuring mechanical torque forces according to an embodiment of the invention.

When trying to measure torque forces 116 on a symmetrically shaped object 11, like for instance a round power transmitting shaft, and using the differential mode signal comparison mode, then the actuator and sensor arrangement, which is perspectively shown in FIG. 22, allows compensating for unwanted environmental effects, like temperature changes, etc. The actuator 52 and the sensors are arranged in a 45 deg angle in relation to the shaft orientation. A side view of this configuration is shown in FIG. 23.

The mechanical force sensor system is based on measuring the changes of the speed with which a solid borne sound wave 71 travels through an object 11 when the mechanical stresses applied to the test object 11 are changed. The sensing module consists of an actuator 52 that is generating the solid borne sound wave 71 in the test object 11 and at least one receiver 12 that is able to receive the solid borne sound wave 71 from the test object 11. When using two receiver devices 12a, 12b and one actuator 52, and placing the receiver units 12a, 12b in a 90 degree angle in relation to each other while the actuator 52 is the center point for this angle measurement, then a differential mode signal processing can be used by comparing the time delays with which the solid borne sound waves 71 arrive at the two receivers 12a, 12b. Depending to the orientation of the 90 deg angle receiver arrangement in relation to the mechanical forces that travel through the test object 11, this specific actuator and receiver module arrangement, which may be placed at the surface of the test object 11, may significantly reduce the unwanted zero signal offset drift effects caused by changes of the operating temperature and changes in the air-gap between the sensing modules and the test object surface. There may be no need of a pretreatment of the test object 11 to make this sensing technology work. The sensing module including the actuator 52 and receiver devices 12a, 12b will be placed at or near the test object 11 and the measurement can be taken immediately. There may be no need for pre-magnetization or degaussing and there may also be no need to attach anything permanently to the test object 11 like it is the case when using strain gage sensors, for example.

When using a magnetic principle based solid borne sound wave actuator 52 and generator 12 which is based on the magnetoelastic and the Villary effect, then any metal can be used that has magnetic properties. The test object 11 does not need to have any magnetic retention properties. This allows using a very wide range of ferro-magnetic materials; basically anything a permanent magnet sticks to is possible. The sensing module including actuator 52 and receiver 12 does not have to touch the test object 11 such that it can be considered as a true none-contact sensing technology. This sensing technology can measure the mechanical forces even when the test object 11 is covered in a paint-coat of any type. This sensing technology may also work correctly even when the test object 11 is covered in a coat of rust.

When using mechanical principles to generate and to detect the solid borne wound wave 71, then any material that has a relative high density can be used to detect and measure the effects when mechanical forces are applied to this object 11. These are for example ceramics, ferro-magnetic metals, metals that have no ferro-magnetic properties, etc.

Using a magnetic support field may enhance the measurement signal quality. Such support field can be created by using different design solutions. A permanent magnet 95 may be placed nearest the test object surface. A magnetized region of the test object 11 can be provided. Therefore a DC electric powered inductor or an AC electric powered inductor can be used. When using an AC current powered magnetic support field of a specific frequency, then it may assist in reducing the unwanted effects caused by EMI (Electro Magnetic Interferences) signals. By using a band-pass filter 60 of exactly the same frequency as the frequency used to drive the support field generator, all other interfering signals will be eliminated. When using a continuous signal wave of a known frequency to generate the SBS-Waves 71, then a band-pass filter 60 can be used in the receiver electronics to improve the signal-to-noise ratio. In this case the frequency of the band-pass filter 60 is the same as the frequency with which the SBS-Waves 71 are transmitted. Both EMI and signal-nose suppressing methods can be used at the same time. For example continuous signal waves for the SBS-Waves 71 and an AC powered magnetic support field. However, in such a case the chosen frequency of the AC powered magnetic support field should be significantly larger than the one used for the SBS-Waves 71. It should be larger at least by factor three, preferably by factor ten.

In the following the pulsed sound wave differential time is described. Instead of a continuous solid borne sound wave signal 71, a single signal, for example a pulse burst signal can be used. While the signal intensity, e. g. energy transfer, is much higher, the overall energy consumption may be lower when comparing this solution with a continuous sound wave signal generator. This is due to a short signal pulse with a longer pause afterwards. A higher energy transfer also allows to increase the spacing or air-gap between the signal actuator 52 or signal receiver 12 and the test object 11.

Figure 24:
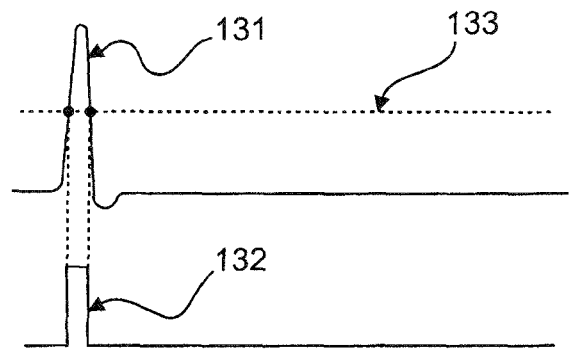
FIG. 24 shows an original wave generator signal and a converted digitized signal according to an embodiment of the invention.

The signal generator 10 and the signal actuator 52 that is placed nearest the surface of the test object 11 generate an analogue type of signal pulse which can then be digitalized by using a comparator or Schmitt-Trigger type of circuit. This aspect is visualized in FIG. 24 in which the original wave generator signal 131 and the converted digitized signal 132 as well as the signal trigger level 133 is shown. By programming or defining a signal trigger level point (or points, when using a Schmitt Trigger), the digitalization circuit may switch its low-high and high-low condition when the analogue signal is passing this point (points).

The solid borne sound wave actuator creates and transmits one signal pulse which may be followed by a pause. There is no definition about how long the signal pause may be.

Figure 25:
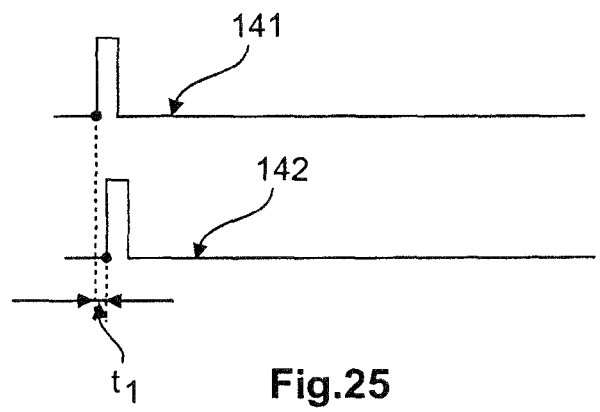
FIG. 25 shows a digitized signal pulse from a wave actuator and from a signal receiver according to an embodiment of the invention.

FIG. 25 shows that one digitized signal pulse from the wave actuator 141 and one digitized signal pulse from the signal receiver 142 may be compared with each other in order to define the signal phase delay time $t_1$.

Figure 26:
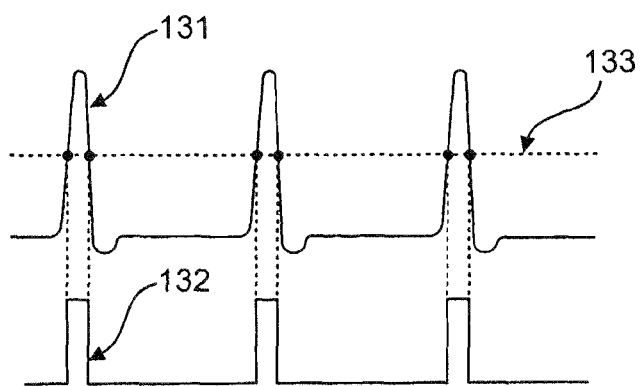
FIG. 26 shows an original wave generator signal and a converted digitized signal according to another embodiment of the invention.

After a predefined pause time, another signal pulse can be generated and passed-through the wave actuator 52. The solid borne sound wave actuator 52 can thus create and transmit several signal pulses. However, the pulse signal pauses can be always longer in time then the signal pulse itself. This is exemplarily visualized in FIG. 26 by showing the original wave generator signal 131 and the converted digitalized signal 132. The signal trigger level 133 is also shown.

Figure 27:
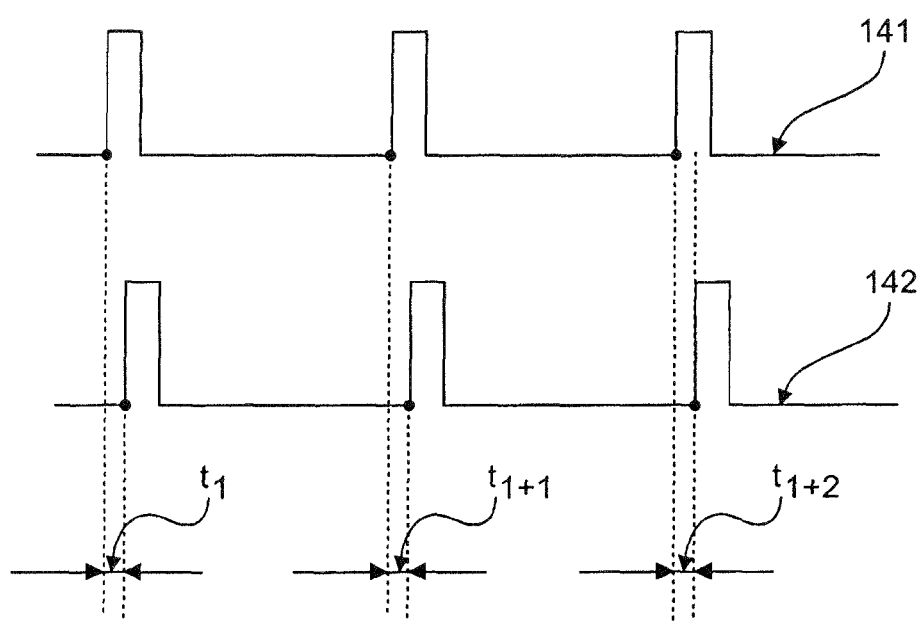
FIG. 27 shows a digitized signal pulses from a wave actuator and digitized signal pulses from a signal receiver according to an embodiment of the invention.

The time delay can be measured whenever a signal pulse has been passed through the signal wave actuator 52 which is shown in FIG. 27. For better understanding, the digitized signal pulses from the wave actuator 141 and the digitized signal pulses from the signal receiver 142 are shown. The respective signal phase delay times $t_1$, $t_{1+1}$, $t_{1+2}$ of the different pulses are also indicated.

While the invention has been illustrated and described in detail in the drawings and the foregoing description, such illustration and description are to be considered illustrative and exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims the term "comprising" does not exclude other elements, and the indefinite article "a" or "an" does not exclude a plurality. The mere fact that certain measures are recited in mutually different dependant claims does not indicate that a combination of these measures cannot be used to advantage. Any reference signs in the claims should not be construed as limiting the scope of protection.

LIST OF REFERENCE SIGNS

1 single receiver solid borne sound wave sensor system
8 comparison signal
10 solid borne sound wave (SBSW) generator
11 test object, object to be measured
12 sound wave receiver
12a first sound wave receiver
12b second sound wave receiver
13 comparator unit, phase delay comparator
14 evaluation unit
20 received signal
21 converted digital signal
22 trigger level 30 time delay difference (t₁)
32 receiver signal, first received solid borne sound wave signal
33 receiver signal, second received solid borne sound wave signal
40 signal phase shift (t₁)
41 signal phase shift (t₂)
42 signal phase shift (t₃)
45 vertical axis
46 horizontal axis
50 single channel receiver solution
52 actuator, solid borne sound wave actuator
53 controlling unit, power diver
54 Schmitt-trigger
55 sensor
56 signal amplifier
58 second Schmitt-trigger
60 band-pass filter
61 generator signal path
62 receiver signal path
70 coil, inductor
72 direction of solid borne sound wave
73 signal source
80 spring mechanism
90 permanently magnetized area, permanent magnetization
200 electro-magnetic converter
300 electro-acoustic converter
91 magnetic field sensing (MFS) device, magnetic sensing unit
92 support field generating coil, electrically powered coil ($L_{RFG}$)
93 magnetic axis of the MFS device
94 magnetic axis of the support field generating coil
95 permanent magnet
96 supporting magnetic field
100 sensing module
101 sensor electronics
102 effective distance
103 output signal
113 bending force
114 horizontal arrow
115 vertical arrow
116 torque force
131 original wave generator signal
132 converted digitized signal
133 trigger level
141 digitized signal pulse from wave actuator
142 digitized signal pulse from signal receiver
$t_1$ time delay
$t_{1+1}$ time delay
$t_{1+2}$ time delay

The invention claimed is:

1. A system for determining a mechanical force applied onto an object, comprising:
 a sound wave generator generating a first solid borne sound wave signal within the object;
 a first sound wave receiver receiving a second solid borne sound wave signal based on the first solid borne sound wave signal generated within the object by the sound wave generator;
 a comparator unit comparing a phase of the first solid borne sound wave signal and a phase of the second solid borne sound wave signal, the comparator unit generating a comparison signal based on the comparing, wherein the comparison signal is a phase-delay differential-mode signal between the first solid borne sound wave signal and the second solid borne sound wave signal; and
 an evaluation unit determining the mechanical force based on the comparison signal and corresponding values stored in a database,
 wherein the database has stored a relation value of the mechanical force and a corresponding comparison signal;
 wherein the values stored in the database are selected from a group comprising at least one of torque forces, bending forces, shear forces, axial load, push-pull forces, or stretching;
 wherein the database is a look-up table;
 wherein the sound wave generator comprises a controlling unit being adapted to generate a sound wave generating controlling signal, wherein the sound wave generating controlling signal forms a base for the first solid borne sound wave signal; and
 wherein the sound wave generator comprises an electro-magnetic converter being adapted to convert the sound wave generating controlling signal into a magnetic pulse, wherein the sound wave generator is adapted to couple the magnetic pulse into the object so as to generate the first solid borne sound wave signal by magnetostriction within the object.

2. The system according to claim 1, further comprising:
 a second sound wave receiver receiving a third solid borne sound wave signal based on the first solid borne sound wave signal generated within the object by the sound wave generator,
 wherein the comparator unit compares a phase of the first solid borne sound wave signal, a phase of the second solid borne sound wave signal and a phase of the third received solid borne sound wave signal, the comparator unit generating the comparison signal based thereon.

3. The system according to claim 2, wherein the sound wave generator, the first sound wave receiver and the second sound wave receiver are arranged in line, and wherein a distance between the sound wave generator and the first sound wave receiver differs from a distance between the sound wave generator and the second sound wave receiver.

4. The system according to claim 2, wherein at least one of the first sound wave receiver and the second sound wave receiver includes a magnetic sensing unit sensing an inversed magnetostriction effect.

5. The system according claim 4, further comprising:
 a supporting magnetic field source providing a supporting magnetic field,
 wherein at least one of the first sound wave receiver and the second sound wave receiver measures a modulation of the supporting magnetic field by an inversed magnetostriction effect resulting from a mechanical impact force applied to the object.

6. The system according to claim 2, wherein at least one of the first sound wave receiver and the second sound wave receiver includes an acoustic to electric converter converting a solid borne sound wave within the object into an electric signal.

7. The system according to claim 1, wherein the sound wave generator includes a dipole sound wave generator generating a solid borne sound wave signal having a directional pattern within the object.

8. The system according to claim 1, wherein the sound wave generator includes an electro-acoustic converter converting the sound wave generating controlling signal into an acoustic signal and wherein the sound wave generator coupling the acoustic signal into the object so as to generate the first solid borne sound wave signal within the object.

9. The system according to claim 1, wherein the controlling unit generates a continuous sound wave generating controlling signal.

10. The system according to claim 1, wherein the controlling unit generates a pulsed sound wave generating controlling signal.

11. The system according to claim 1, wherein the database is represented by an algorithm.

* * * * *